US010366123B1

United States Patent
Madhani et al.

(10) Patent No.: US 10,366,123 B1
(45) Date of Patent: *Jul. 30, 2019

(54) TEMPLATE-FREE EXTRACTION OF DATA FROM DOCUMENTS

(71) Applicant: INTUIT INC., Mountain View, CA (US)

(72) Inventors: Sunil H. Madhani, Sammamish, WA (US); Anu Sreepathy, Bangalore (IN); Samir Revti Kakkar, Bangalore (IN)

(73) Assignee: INTUIT INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/967,375

(22) Filed: Apr. 30, 2018

Related U.S. Application Data

(63) Continuation of application No. 13/960,093, filed on Aug. 6, 2013, now Pat. No. 10,019,535.

(51) Int. Cl.
*G06F 17/30* (2006.01)
*G06F 16/90* (2019.01)

(52) U.S. Cl.
CPC .................................. *G06F 16/90* (2019.01)

(58) Field of Classification Search
CPC ....................... G06F 17/30943; G06F 16/90
See application file for complete search history.

(56) References Cited

U.S. PATENT DOCUMENTS

| | | | |
|---|---|---|---|
| 7,505,984 B1* | 3/2009 | Nevill-Manning | G06F 17/2211 |
| 7,561,734 B1* | 7/2009 | Wnek | G06F 17/243 382/159 |
| 8,051,372 B1* | 11/2011 | Sandhaus | G06F 17/30911 707/999.104 |
| 8,122,005 B1* | 2/2012 | Juang | G06F 17/30707 706/12 |
| 9,418,385 B1* | 8/2016 | Wang | G06Q 40/10 |

(Continued)

OTHER PUBLICATIONS

Ling Ma et al., "Extracting Unstructured Data from Template Generated Web Documents", Nov. 3, 2003, ACM, pp. 512-515 (Year: 2003).*

(Continued)

*Primary Examiner* — Jared M Bibbee
(74) *Attorney, Agent, or Firm* — Patterson + Sheridan, LLP

(57) ABSTRACT

The disclosed embodiments provide a system that processes data. One example embodiment is a computer-implemented method for processing data. The computer-implemented method includes obtaining text from a document associated with a user, wherein the document was generated based on a template and, with the obtained text intact, applying a set of rules to each term in the obtained text to determine a broad category of a plurality of terms associated with the term. The computer-implemented method further includes applying an additional set of rules to refine the broad category associated with the term to a refined category of fewer terms based on a location in the document of at least one term in the broad category of the plurality of terms, extracting a term from the obtained text using template-independent code developed to process documents generated based on a plurality of templates and enabling use of the term with an application.

20 Claims, 6 Drawing Sheets

(56) References Cited

U.S. PATENT DOCUMENTS

| | | | | |
|---|---|---|---|---|
| 2001/0049602 A1* | 12/2001 | Walker | ............... | G10L 13/08 704/260 |
| 2002/0112114 A1* | 8/2002 | Blair | ............... | G06Q 30/08 711/100 |
| 2004/0103116 A1* | 5/2004 | Palanisamy | ............... | G06F 17/30569 |
| 2004/0107123 A1* | 6/2004 | Haffner | ............... | G06Q 30/02 705/30 |
| 2005/0144000 A1* | 6/2005 | Yamasaki | ............... | G06F 17/30528 704/252 |
| 2009/0049375 A1* | 2/2009 | Aughenbaugh | ............... | G06F 3/04883 715/253 |
| 2011/0078098 A1* | 3/2011 | Lapir | ............... | G06F 17/30705 706/12 |
| 2011/0106892 A1* | 5/2011 | Nelson | ............... | G06Q 10/109 709/206 |
| 2012/0191730 A1* | 7/2012 | Parikh | ............... | G06Q 30/0201 707/754 |
| 2012/0203718 A1* | 8/2012 | Biran | ............... | G06N 5/025 706/12 |
| 2012/0203761 A1* | 8/2012 | Biran | ............... | G06F 17/30985 707/713 |
| 2012/0204000 A1* | 8/2012 | Biran | ............... | G06F 17/30985 711/202 |
| 2012/0330971 A1* | 12/2012 | Thomas | ............... | G06F 17/30663 707/748 |
| 2013/0275433 A1* | 10/2013 | Shibata | ............... | G06F 17/3071 707/740 |
| 2014/0089302 A1* | 3/2014 | Lapir | ............... | G06F 17/3053 707/723 |
| 2014/0343920 A1* | 11/2014 | Srinivasan | ............... | G06F 17/271 704/9 |
| 2016/0154876 A1* | 6/2016 | Agrawal | ............... | G06F 17/30616 707/740 |

OTHER PUBLICATIONS

Shuyi Zheng et al., "Template-Independent News Extraction Based on Visual Consistency", 2007, pp. 1507-1512 (Year: 2007).*

\* cited by examiner

TEMPLATE-FREE EXTRACTION OF DATA FROM DOCUMENTS

CROSS-REFERENCE TO RELATED APPLICATIONS

This Application is a Continuation of application Ser. No. 13/960,093 filed on Aug. 6, 2013, which is herein incorporated by reference in its entirety.

BACKGROUND

The disclosed embodiments relate to techniques for extracting data. More specifically, the disclosed embodiments relate to techniques for template-free extraction of data from documents.

Data processing and exchange are essential to many business and personal transactions. For example, small businesses may use accounting and/or inventory data to obtain and share reports regarding inventory sales, customer invoices, and/or cash flow. Similarly, healthcare providers may examine medical records to view patient information related to insurance providers, medical conditions, and/or office visits.

In addition, data exchange among users frequently involves the use of documents such as word-processing documents, spreadsheets, and/or Portable Document Format (PDF) documents. For example, a business may manage business transactions with a set of customers by creating a set of bills, invoices, and/or other types of documents containing data associated with the business transactions and transmitting the documents to the respective customers via email. The customers may use the data in the documents to pay the bills and/or invoices, respond to the business, and/or update their records of the transactions.

However, variations in the layouts and/or designs of documents may preclude efficient extraction and/or transfer of data from the documents. For example, a customer may receive electronic bills, invoices and/or other documents from a variety of businesses and/or companies. While the documents may include many of the same types of data, the locations of the data may vary across documents from different companies. As a result, the customer may be unable to automatically extract the data from the documents into the application, even if the documents are in digital form. Instead, the customer may be required to manually enter the data from the documents into an application for managing the data (e.g., an accounting application).

Consequently, use of documents may be facilitated by mechanisms for automatically extracting data from the documents.

SUMMARY

The disclosed embodiments provide a system that processes data. During operation, the system obtains text from a document associated with a user. Next, the system applies a set of rules to each word in the text to determine a context associated with the word. The system then extracts data associated with the context from the text. Finally, the system enables use of the data with one or more applications without requiring manual input of the data into the one or more applications.

In some embodiments, the system also obtains a modification to the extracted data from the user, and uses the modification to update the set of rules.

In some embodiments, obtaining the modification to the extracted data from the user involves obtaining an updated location of one or more words associated with the context in the document from the user.

In some embodiments, applying the set of rules to each word in the text to determine the context associated with the word involves categorizing the word based on at least one of a character type and a character sequence in the word, and determining the context based on the categorized word and a categorization of one or more words in proximity to the word.

In some embodiments, applying the set of rules to each word in the text to determine the context associated with the word further involves determining the context based on a location of the word in the document.

In some embodiments, the character type is at least one of a numeric character type, an alphabetic character type, an alphanumeric character type, and a special character type.

In some embodiments, extracting data associated with the context from the text involves at least one of:
 (i) storing the word in a data element;
 (ii) storing one or more additional words associated with the context in the data element; and
 (iii) creating, for the data element, one or more tags representing the context.

In some embodiments, enabling use of the data with the one or more applications without requiring manual input of the data into the one or more applications involves:
 (i) obtaining, from an application, a request for data associated with a tag from the one or more tags;
 (ii) matching the tag to the data element; and
 (iii) providing the data element to the application.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

In the figures, like reference numerals refer to the same figure elements.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

The following description is presented to enable any person skilled in the art to make and use the embodiments, and is provided in the context of a particular application and its requirements. Various modifications to the disclosed embodiments will be readily apparent to those skilled in the art, and the general principles defined herein may be applied to other embodiments and applications without departing from the spirit and scope of the present disclosure. Thus, the present invention is not limited to the embodiments shown, but is to be accorded the widest scope consistent with the principles and features disclosed herein.

The data structures and code described in this detailed description are typically stored on a computer-readable storage medium, which may be any device or medium that can store code and/or data for use by a computer system. The computer-readable storage medium includes, but is not limited to, volatile memory, non-volatile memory, magnetic and optical storage devices such as disk drives, magnetic tape, CDs (compact discs), DVDs (digital versatile discs or digital video discs), or other media capable of storing code and/or data now known or later developed.

The methods and processes described in the detailed description section can be embodied as code and/or data, which can be stored in a computer-readable storage medium as described above. When a computer system reads and executes the code and/or data stored on the computer-readable storage medium, the computer system performs the methods and processes embodied as data structures and code and stored within the computer-readable storage medium.

Furthermore, methods and processes described herein can be included in hardware modules or apparatus. These modules or apparatus may include, but are not limited to, an application-specific integrated circuit (ASIC) chip, a field-programmable gate array (FPGA), a dedicated or shared processor that executes a particular software module or a piece of code at a particular time, and/or other programmable-logic devices now known or later developed. When the hardware modules or apparatus are activated, they perform the methods and processes included within them.

Figure 1:
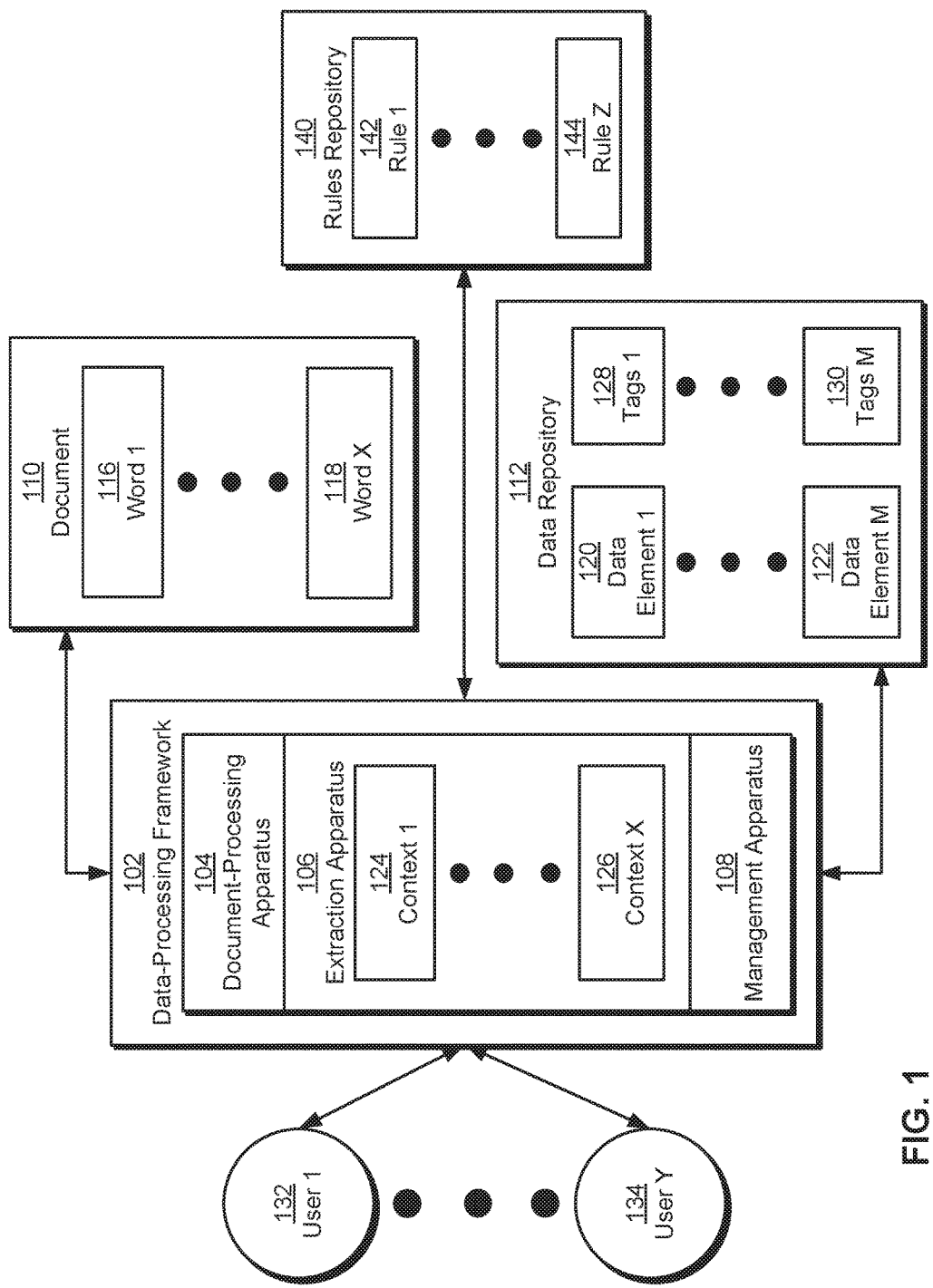
FIG. 1 shows a schematic of a system in accordance with the disclosed embodiments.

The disclosed embodiments provide a method and system for processing data. As shown in FIG. 1, the data may be included in a document 110 such as a word-processing document, spreadsheet, Portable Document Format (PDF) document, web page, and/or another type of digitized document. For example, document 110 may be a bill, invoice, form, statement, transcript, record, receipt, tax document, and/or other type of document that includes a specific type and/or set of data without adhering to a strict layout and/or format for showing the data. Document 110 may be generated digitally using a word-processing application, spreadsheet application, diagramming application, graphics-editing application, and/or other application for creating electronic documents. Alternatively, document 110 may correspond to a scanned and/or photographed digital copy of a physical document.

Those skilled in the art will appreciate that the lack of common design, layout, and/or format between document 110 and other documents may prevent efficient extraction and/or transfer of data from document 110 to an application used to process and/or manage the data. For example, data may be automatically extracted to the application from a widely used document (e.g., a government form) after an engineering team updates the application with code that can process the document and/or a template for the document. On the other hand, custom development of data-extraction code may be unfeasible for a large number of less common documents and/or documents that frequently vary in design and/or layout. Instead, users (e.g., user 1 132, user y 134) of the documents may be involved in a tedious, time-consuming, and/or error-prone process of manually entering data from the documents into the application before using the data with the application.

In one or more embodiments, the system of FIG. 1 includes functionality to automatically extract data from document 110 without requiring use of a template and/or custom code for extracting the data. As shown in FIG. 1, the system may correspond to a data-processing framework 102 that determines a context (e.g., context 1 124, context x 126) associated with each word (e.g., word 1 116, word x 118) in document 110 and stores data associated with the words and contexts in a set of data elements (e.g., data element 1 120, data element m 122) and tags (e.g., tags 1 128, tags m 130).

First, a document-processing apparatus 104 in data-processing framework 102 may obtain text from document 110. For example, document-processing apparatus 104 may include functionality to extract embedded text as a set of words (e.g., word 1 116, word x 118) from a PDF document, word-processing document, spreadsheet, and/or other type of digitally created document. Alternatively, document-processing apparatus 104 may perform optical character recognition (OCR) of the words from a scanned and/or photographed image of document 110. During OCR of document 110, document-processing apparatus 104 may apply skew correction, binarization, brightening, unsharpening, exposure setting, and/or autofocus to the image. Document-processing apparatus 104 may then extract the text from the image. Finally, document-processing apparatus may analyze the extracted text to remove garbage characters and/or obtain individual words from the text.

Next, an extraction apparatus 106 in data-processing framework 102 may obtain a set of rules (e.g., rule 1 142, rule z 144) from a rules repository 140 and apply the rules to each word in the text to determine a context (e.g., context 1 124, context x 126) associated with the word. As discussed in further detail below with respect to FIG. 2, the context may be based on a character type and/or character sequence in the word, the location of the word in document 110, and/or the categorization of other words in proximity to the word. In other words, extraction apparatus 106 may analyze the text and/or layout of document 110 to determine the "meaning" of words in the text, thus averting the use of custom code and/or templates in identifying data in document 110.

Extraction apparatus 106 may then extract data associated with the context from the text. In particular, extraction apparatus 106 may store the word and/or one or more additional words associated with the context in a data repository 112 as a data element (e.g., data element 1 120, data element m 122). Extraction apparatus 106 may also create one or more tags (e.g., tags 1 128, tags m 130) representing the context for the data element and store the tags in data repository 112. For example, extraction apparatus 106 may store one or more words containing a name of a business in a data element and associate the data element with tags such as "business," "company," "business name," "company name," and/or "Box 1."

Finally, a management apparatus 108 in data-processing framework 102 may enable, for the user, use of the extracted data with one or more applications without requiring manual input of the data into the application(s) by the user. For example, management apparatus 108 may provide an interface for importing data from data repository 112 into a set of applications. Upon receiving a request for data associated with a specific tag through the interface (e.g., from an application), management apparatus 108 may match the tag to a data element in data repository 112 and provide the data element to the application from which the request was received. Because the data may be associated with multiple tags, different applications may request the same data element in different ways. For example, one application may request the data element associated with "company name," while another application may request the same data element using the "Box 1" tag.

Alternatively, management apparatus 108 may form a part of the application and allow the user to interact directly with the extracted data. For example, management apparatus 108 may allow the user to view the data, update his/her records with the data, transmit and/or share the data with one or more other users, and/or perform other tasks associated with the data through the application.

After the data is presented to the user by management apparatus 108 and/or the application, the user may provide modifications to the extracted data. For example, the user may correct inaccuracies in a data element associated with a given context by highlighting, selecting, and/or otherwise specifying the location of one or more words associated with the context in document 110. Extraction apparatus 106 may use the specified location to extract the words from the document and replace the contents of the data element with the extracted words.

Extraction apparatus 106 may also use the modification to update the set of rules in rules repository 140. Continuing with the above example, extraction apparatus 106 may update the rules so that the location and/or characteristics of the user-provided words and/or nearby words are associated with the context. Such updating may facilitate subsequent extraction of data from similar documents by improving the accuracy of data extraction from the documents.

By analyzing text in documents to determine the context of words in the documents, data-processing framework 102 may enable the automatic extraction of data from the documents without requiring the use of templates and/or engineering changes to accommodate the layouts, designs, and/or formats of the documents. In other words, data-processing framework 102 may be used with different document formats, various types of data, and/or multiple applications. The increased and/or automated extraction of data from the documents may further reduce overhead and/or user error associated with manually entering data from the documents into the applications, thus improving use of both the data and the applications by the users.

Those skilled in the art will appreciate that the system of FIG. 1 may be implemented in a variety of ways. First, document-processing apparatus 104, extraction apparatus 106, management apparatus 108, data repository 112, and rules repository 140 may be provided by a single physical machine, multiple computer systems, a grid, one or more databases, one or more file systems, and/or a cloud computing system. In addition, document-processing apparatus 104, extraction apparatus 106, and management apparatus 108 may be provided by the same hardware and/or software component or execute independently from one another. For example, document-processing apparatus 104, extraction apparatus 106, and management apparatus 108 may form a part of an application that is used to process and manage data from a set of documents for a user. On the other hand, one or more components of data-processing framework 102 may execute outside the application and provide data from the documents in a form that can be used by the application and/or other applications after extracting the data from the documents.

Second, data-processing framework 102 may be configured for use with various types of electronic documents and/or data. For example, data-processing framework 102 may accept multiple types and/or file formats of documents and/or include functionality to convert the documents into a file format that is suitable for text and/or data extraction. Data-processing framework 102 may further obtain and/or store data in data repository 112 and/or rules in rules repository 140 as relational-database records, property lists, Extensible Markup Language (XML) documents, JavaScript Object Notation (JSON) objects, and/or other types of structured data.

Figure 2:
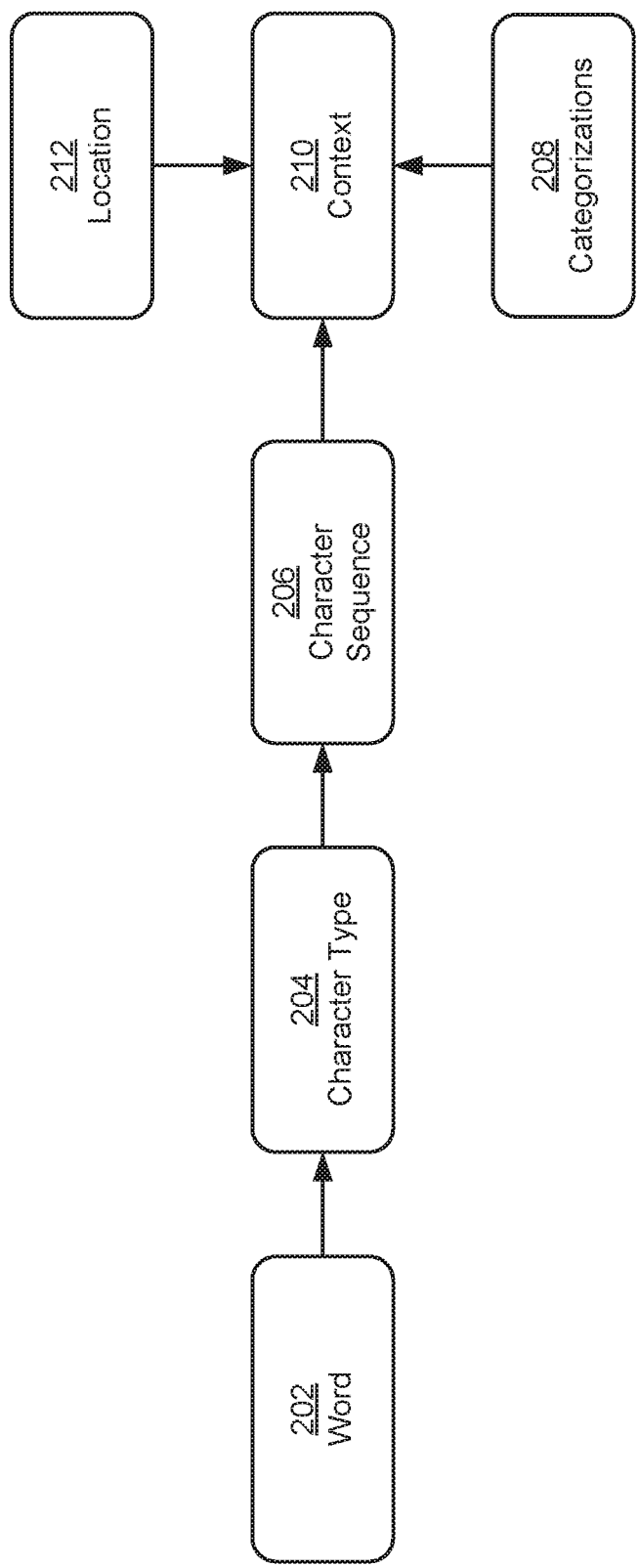
FIG. 2 shows the determination of a context associated with a word in a document in accordance with the disclosed embodiments.

FIG. 2 shows the determination of a context 210 associated with a word 202 in a document in accordance with the disclosed embodiments. As mentioned above, word 202 may be obtained from a body of text in the document. In addition, word 202 may represent a sequence of characters that is separated from other words in the document by whitespace and/or physical space. For example, the space between adjacent characters in word 202 may be smaller than the space between word 202 and characters of nearby words in the document.

During the determination of context 210, word 202 may initially be categorized by a character type 204 found in word 202. For example, character type 204 may include a numeric character type, an alphabetic character type, an alphanumeric character type, and/or a special (e.g., non-alphanumeric) character type. In other words, character type 204 may represent a broad categorization of word 202 into one of several different categories.

Word 202 may further be categorized based on a character sequence 206 associated with character type 204. In particular, one or more characters in word 202 may be matched to one of a set of possible character sequences associated with character type 204. For example, a set of rules for identifying context 210 based on character sequences may include the following:

define AMT_REGEX @"\\b([$]?[0-9][,0-9]*\\.[0-9]{1,2})\\b"

define PARSE_AMT_REGEX @"\\b([0-9][,0-9]*\\.[0-9]{1,2})\\b"

define ACCT_NUM_REGEX @"[0-9][-0-9A-Z]{5,}"

define ACCOUNT_LABEL_REGEX @"([Aa]ccount|CCOUNT)|[Nn]o|Number|Acct Policy Number|No.|AccouRUiumb|[Mm]ember|[Mm]embership"

define AMT_LABEL_REGEX @"Minimum|[Aa][Mm][Oo][Uu][Nn][Tt][Dd][Uu][Ee]|Assessment [Aa][Mm][Oo][Uu][Nn][Tt]|Full [Aa][Mm][Oo][Uu][Nn][Tt] [Dd][Uu][Ee]| BALANCE [Dd][Uu][Ee]| TOTAL [Dd][Uu][Ee]| TOTAL [Aa][Mm][Oo][Uu][Nn][Tt][Dd][Uu][Ee]|TOTAL DUE BY|PAY THIS AMOUNT"

define DATE_REGEX @"([0-1]?[0-9][-/]([0-3][0-9])|([1-9]))[-/]'?[0-9]{2,4})|([A-Za-z]{3,9}\\.? *[0-9]{1,2}((,)|(+)|(,. *))'?[0-9]{2,4})"

define ADDRESS_REGEX @"[^A-Z0-9,.&#_\\s-]*"

define US_STATES_REGEX @"\\b(C[AOT]|D[EC]|F[LM]|G[AU]|HI|I[ADLN]|K[SY]|LA|M[ADEHIN-OPST]|N[CDE HJMVY]|O[HKR]|P[ARW]|RI|S[CD]|T[NX]|UT|V[AIT]|W[AIVY])\\b"

```
#define US_ZIP_CODES_REGEX @ "^([0-9]{5}-[0-9]
    {4})$"//"(\\b[0-9]{4}\b[1-9])|(\\b[0-9]{3}[1-9][0-9])
    "//"(\d{5}$)|(\d{5}-\d{4}$)"
#define US_PO_BOX   @"P[oO]|B[oO][xX]|P[oO][sS]
    [tT]"
#define NO_MATCH @"Unable to detect"
//#define    GARBAGE    @"(?:\\^\\^|\\-\\+\\-
    |\\*\\*|\\^|\\.\\.|http|FWfh|yt|\\;|\\<|»|«|\\>|●*|\\;|\"|\\|)"
#define ONLY_ALPHA_NUMBERS @"[a-zA-Z0-9-]+
    $"
#define US_PHONE_NUMBERS @"\\b([235689][0-9]
    {6}([0-9]{3})?)\\b"
#define ONLY_ALPHA @"\\b([a-zA-Z]+)\\b"
#define GARGBAGE_ACCT_NUM @"[$]|,|/"
```

In the above example, each rule is denoted by a "#define." Next, the rule specifies a name for the corresponding context, such as "AMT_REGEX," "ACCT_NUM_REGEX," "DATE_REGEX," "ADDRESS_REGEX," and/or "US_PHONE_NUMBERS." The rule then specifies a regular expression for a character sequence matching the context. Context 210 may thus be established after a match is made between character sequence 206 and a regular expression in the rules.

Context 210 may additionally be updated based on additional categorizations 208 of words in proximity to word 202. For example, word 202 may be categorized as a dollar amount based on a match between character sequence 206 and a regular expression for a dollar amount context 210. Context 210 may then be further narrowed to a payment amount after words near word 202 match character sequences such as "Total," "Balance Due," or "Pay this amount."

Finally, context 210 may be based on a location 212 of word 202 in the document. For example, word 202 may be categorized as a date. If word 202 is also found in the bottom third of a document representing a bill or invoice, word 202 may be categorized as a due date instead of an invoice or bill date. In other words, context 210 may be established by initially applying a set of rules to obtain a broad categorization of word 202, then refining the categorization by applying additional sets of rules to word 202 based on the previous categorizations of word 202.

Figure 3:
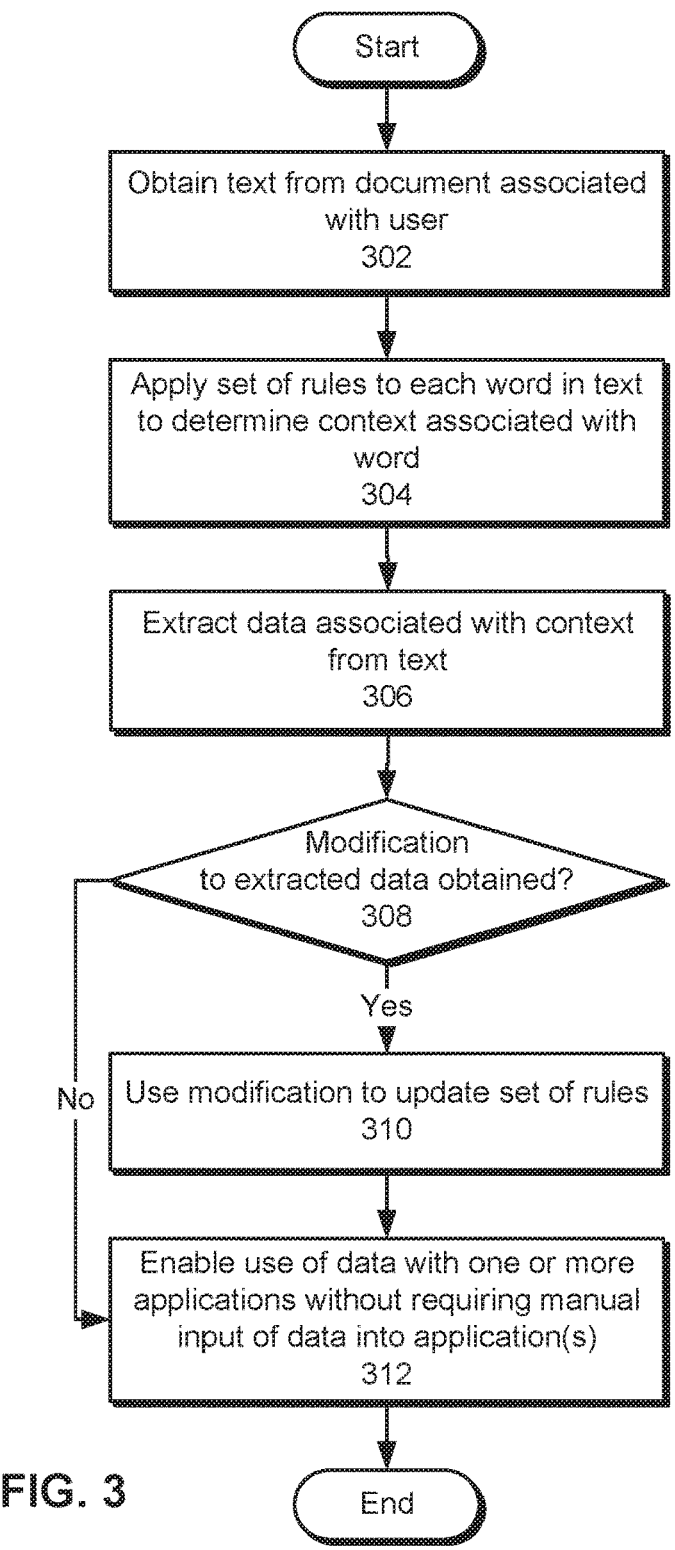
FIG. 3 shows a flowchart illustrating the processing of data in accordance with the disclosed embodiments.

FIG. 3 shows a flowchart illustrating the processing of data in accordance with the disclosed embodiments. In one or more embodiments, one or more of the steps may be omitted, repeated, and/or performed in a different order. Accordingly, the specific arrangement of steps shown in FIG. 3 should not be construed as limiting the scope of the embodiments.

Initially, text is obtained from a document associated with a user (operation 302). The text may be read from the document based on a file format of the document, or the text may be obtained using OCR. Next, a set of rules is applied to each word in the text to determine a context associated with the word (operation 304), and data associated with the context is extracted from the text (operation 306), as discussed in further detail below with respect to FIG. 4.

A modification to the extracted data may be obtained (operation 308) from the user. For example, the user may be presented with the extracted data to enable correction of any inaccuracies in the extracted data by the user. If an inaccuracy exists in data for a given context, an updated location of one or more words associated with the context in the document may be obtained from the user. The location, character type, character sequences, and/or other characteristics of words in the modification may then be used to update the set of rules (operation 310) to facilitate subsequent extraction of data associated with the context. On the other hand, the rules may not be updated if no modification to the extracted data is obtained from the user.

Finally, use of the data with one or more applications is enabled without requiring manual input of the data into the application(s) (operation 312). For example, the extracted data may be displayed to the user, approved by the user, used to update the user's records, and/or used to perform one or more tasks for the user within an application. In addition, the data may be provided to the application based on a request for data associated with a context, as discussed in further detail below with respect to FIG. 5.

Figure 4:
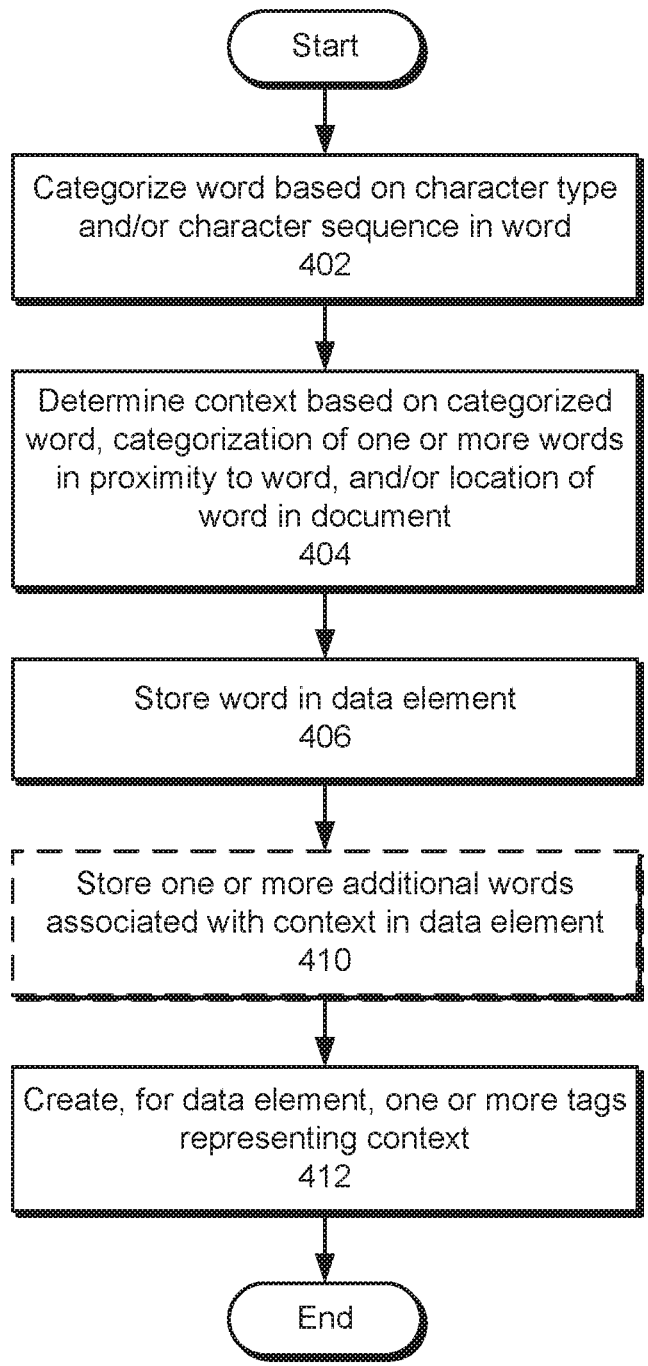
FIG. 4 shows a flowchart illustrating the process of using a context to extract data from a document in accordance with the disclosed embodiments.

FIG. 4 shows a flowchart illustrating the process of using a context to extract data from a document in accordance with the disclosed embodiments. In one or more embodiments, one or more of the steps may be omitted, repeated, and/or performed in a different order. Accordingly, the specific arrangement of steps shown in FIG. 4 should not be construed as limiting the scope of the embodiments.

First, a word in the document is categorized based on a character type and/or character sequence in the word (operation 402). For example, the word may be examined for numeric characters, alphabetic characters, alphanumeric characters, and/or special characters. One or more character sequences in the word may also be identified using regular expressions for the character sequences.

Next, a context for the word is determined based on the categorized word, the categorization of one or more words in proximity to the word, and/or the location of the word in the document (operation 404). For example, the categorization of the word from the character type and/or character sequence may be refined based on the categorization of nearby words and/or the word's location and used as the context.

The word is then stored in a data element (operation 406), optionally along with one or more additional words associated with the context (operation 410). For example, a word containing a street number in a postal address may be stored with words containing a street name, city, state, Zone Improvement Program (ZIP) code, and/or country in the address. Finally, one or more tags representing the context are created for the data element (operation 412). Continuing with the above example, the data element containing the address may include tags such as "Address," "Mailing Address," and/or "Postal Address."

Figure 5:
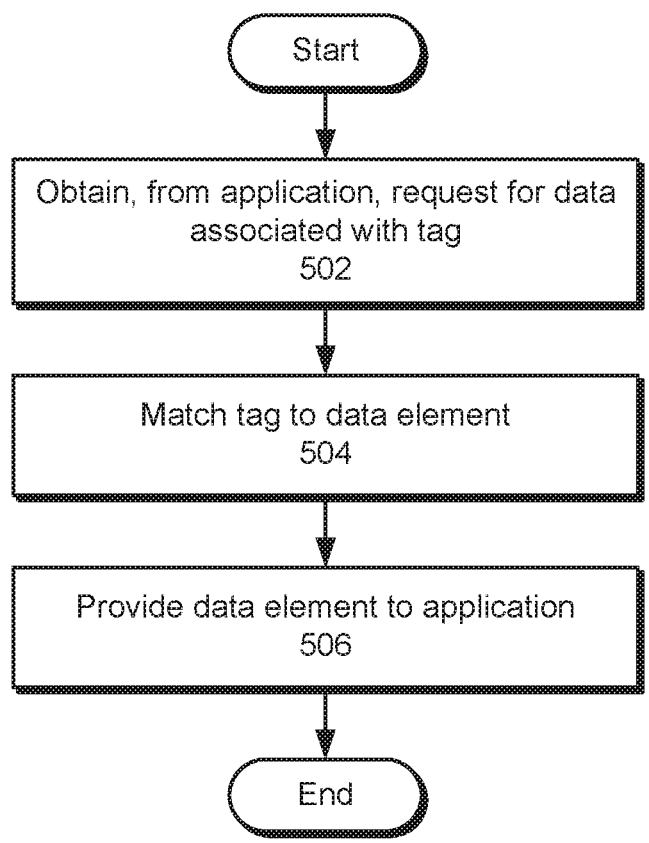
FIG. 5 shows a flowchart illustrating the process of enabling use of data extracted from a document with an application in accordance with the disclosed embodiments.

FIG. 5 shows a flowchart illustrating the process of enabling use of data extracted from a document with an application in accordance with the disclosed embodiments. In one or more embodiments, one or more of the steps may be omitted, repeated, and/or performed in a different order. Accordingly, the specific arrangement of steps shown in FIG. 5 should not be construed as limiting the scope of the embodiments.

First, a request for data associated with a tag is obtained from the application (operation 502). As described above, the tag may be stored and/or associated with a data element and represent a context for the data element. Next, the tag is matched to the data element (operation 504). For example, a database query may be performed for database rows containing and/or matching the tag. Finally, the data element is provided to the application (operation 506) to enable use of the data element with the application without requiring manual input of the data element into the application by a user.

Figure 6:
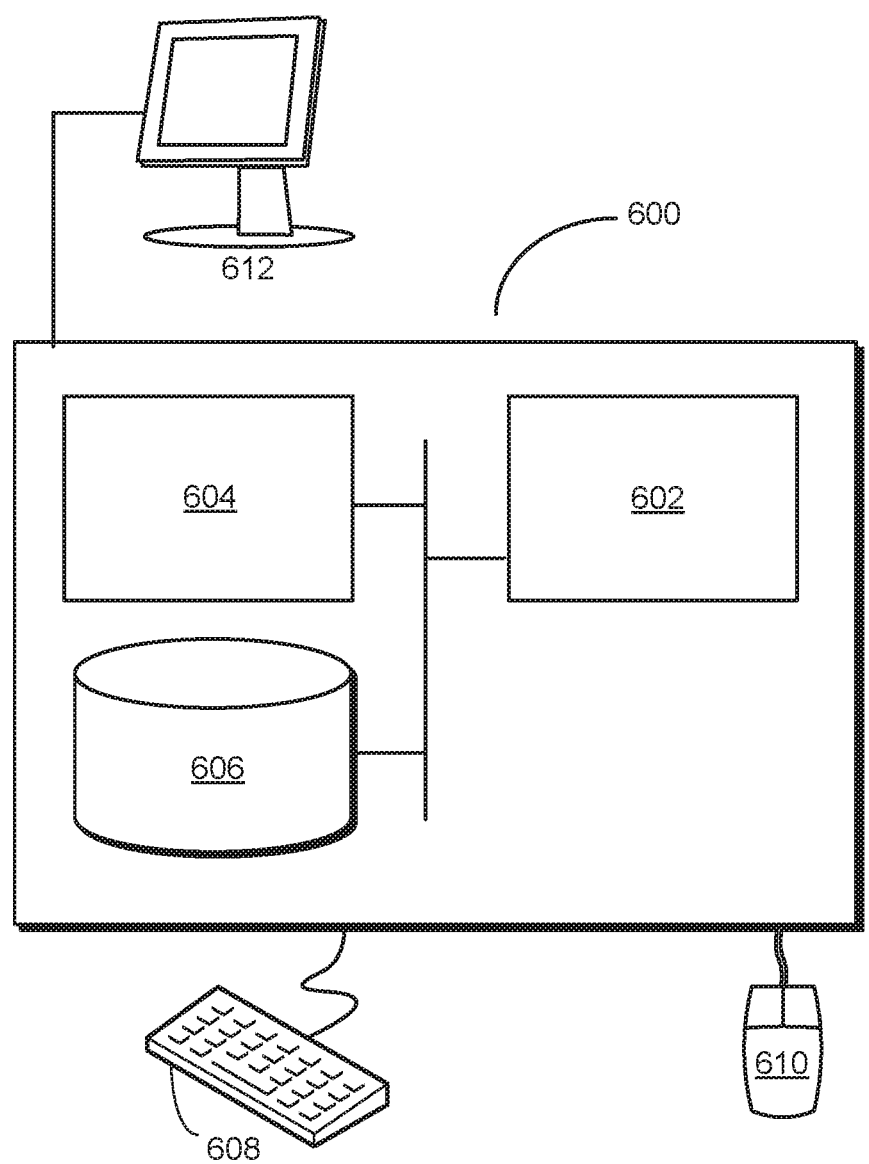
FIG. 6 shows a computer system in accordance with the disclosed embodiments.

FIG. 6 shows a computer system 600 in accordance with an embodiment. Computer system 600 includes a processor 602, memory 604, storage 606, and/or other components found in electronic computing devices such as personal computers, laptop computers, workstations, servers, mobile phones, tablet computers, and/or portable media players. Processor 602 may support parallel processing and/or multi-threaded operation with other processors in computer system 600. Computer system 600 may also include input/output (I/O) devices such as a keyboard 608, a mouse 610, and a display 612.

Computer system 600 may include functionality to execute various components of the present embodiments. In particular, computer system 600 may include an operating system (not shown) that coordinates the use of hardware and software resources on computer system 600, as well as one or more applications that perform specialized tasks for the user. To perform tasks for the user, applications may obtain the use of hardware resources on computer system 600 from the operating system, as well as interact with the user through a hardware and/or software framework provided by the operating system.

In one or more embodiments, computer system 600 provides a system for processing data. The system may include a document-processing apparatus that obtains text from a document associated with a user. The system may also include an extraction apparatus that applies a set of rules to each word in the text to determine a context associated with the word and extracts data associated with the context from the text. Finally, the system may include a management apparatus that enables use of the data with one or more applications without requiring manual input of the data into the one or more applications.

In addition, one or more components of computer system 600 may be remotely located and connected to the other components over a network. Portions of the present embodiments (e.g., document-processing apparatus, analysis apparatus, management apparatus, etc.) may also be located on different nodes of a distributed system that implements the embodiments. For example, the present embodiments may be implemented using a cloud computing system that automatically extracts data from a set of documents for use with one or more applications and a set of remote users without requiring use of templates for the documents.

The foregoing descriptions of various embodiments have been presented only for purposes of illustration and description. They are not intended to be exhaustive or to limit the present invention to the forms disclosed. Accordingly, many modifications and variations will be apparent to practitioners skilled in the art. Additionally, the above disclosure is not intended to limit the present invention.

What is claimed is:

1. A computer-implemented method for processing data, comprising:
   obtaining text from a document associated with a user, wherein the document was generated based on a template;
   with the obtained text intact, applying a set of rules to each term in the obtained text to determine a broad category of a plurality of terms associated with the term;
   applying an additional set of rules to refine the broad category associated with the term to a refined category of fewer terms based on a location in the document of at least one term in the broad category of the plurality of terms;
   extracting a term from the obtained text using template-independent code developed to process documents generated based on a plurality of templates; and
   enabling use of the term with an application.

2. The computer-implemented method of claim 1, further comprising:
   applying a set of rules to each term in the obtained text to determine a context associated with the term;
   obtaining a modification to the determined context for one of the extracted terms from the user; and
   using the modification to update the set of rules.

3. The computer-implemented method of claim 2, wherein obtaining the modification to the determined context for the one of the extracted terms from the user involves:
   obtaining an updated location in the document of the one of the extracted terms.

4. The computer-implemented method of claim 2, wherein applying the set of rules to each term in the obtained text to determine the context associated with the term involves:
   categorizing the term based on at least one of a character type and a character sequence in the term; and
   determining the context based on the categorized term and a categorization of one or more terms in proximity to the term.

5. The computer-implemented method of claim 4, wherein applying the set of rules to each term in the obtained text to determine the context associated with the term further involves: determining the context based on a location of the term in the document.

6. The computer-implemented method of claim 4, wherein the character type is at least one of:
   a numeric character type;
   an alphabetic character type;
   an alphanumeric character type; and
   a special character type.

7. The computer-implemented method of claim 2, further comprising:
   storing each extracted term in one of a plurality of data elements according to the determined context; and
   creating, for each data element, one or more tags representing the context.

8. The computer-implemented method of claim 7, wherein enabling use of each data element with the one or more applications without requiring manual input of the extracted terms into the one or more applications involves:
   obtaining, from an application, a request for data associated with a tag from the one or more tags;
   matching the tag to one of the data elements; and
   providing the one of the data elements to the application.

9. A system for processing data, comprising:
   a memory;
   a processor; and
   a non-transitory computer-readable storage medium storing instructions that, when executed on the processor, cause the processor to instantiate:
   a document-processing apparatus configured to obtain text from a document associated with a user, wherein the document was generated based on a template;
   an extraction apparatus configured to:
      with the obtained text intact, apply a set of rules to each term in the obtained text to determine a broad category of a plurality of terms associated with the term;
      apply an additional set of rules to refine the broad category associated with the term to a refined category of fewer terms based on a location in the document of at least one term in the broad category of the plurality of terms;

extract a term from the obtained text using template-independent code developed to process documents generated based on a plurality of templates; and enable use of the term with an application;

a management apparatus configured to enable use of the term with an application.

10. The system of claim 9, wherein the extraction apparatus is further configured to:

apply a set of rules to each term in the obtained text to determine a context associated with the term;

obtain a modification to the determined context for one of the extracted terms from the user; and use the modification to update the set of rules.

11. The system of claim 10, wherein applying the set of rules to each term in the obtained text to determine the context associated with the term involves:

categorizing the term based on at least one of a character type and a character sequence in the term; and determining the context based on at least one of the categorized term, a categorization of one or more terms in proximity to the term, and a location of the term in the document.

12. The system of claim 11, wherein the character type is at least one of:

a numeric character type;

an alphabetic character type;

an alphanumeric character type; and a special character type.

13. The system of claim 10, wherein the extraction apparatus is further configured to:

store each extracted term in one of a plurality of data elements according to the determined context; and create, for each data element, one or more tags representing the context.

14. The system of claim 13, wherein enabling use of each data element with the one or more applications without requiring manual input of the extracted terms into the one or more applications involves:

obtaining, from an application, a request for data associated with a tag from the one or more tags;

matching the tag to one of the data elements; and providing the one of the data elements to the application.

15. A non-transitory computer-readable storage medium storing instructions that when executed by a computer cause the computer to perform a method for processing data, the method comprising:

obtaining text from a document associated with a user, wherein the document was generated based on a template;

with the obtained text intact, applying a set of rules to each term in the obtained text to determine a broad category of a plurality of terms associated with the term;

applying an additional set of rules to refine the broad category associated with the term to a refined category of fewer terms based on a location in the document of at least one term in the broad category of the plurality of terms;

extracting a term from the obtained text using template-independent code developed to process documents generated based on a plurality of templates; and enabling use of the term with an application.

16. The non-transitory computer-readable storage medium of claim 15, the method further comprising:

applying a set of rules to each term in the obtained text to determine a context associated with the term;

obtaining a modification to the determined context for one of the extracted terms from the user; and using the modification to update the set of rules.

17. The non-transitory computer-readable storage medium of claim 16, wherein applying the set of rules to each term in the obtained text to determine the context associated with the term involves:

categorizing the term based on at least one of a character type and a character sequence in the term; and determining the context based on at least one of the categorized term, a categorization of one or more terms in proximity to the term, and a location of the term in the document.

18. The non-transitory computer-readable storage medium of claim 17, wherein the character type is at least one of:

a numeric character type;

an alphabetic character type;

an alphanumeric character type; and a special character type.

19. The non-transitory computer-readable storage medium of claim 16, the method further comprising:

storing each extracted term in one of a plurality of data elements according to the determined context; and creating, for each data element, one or more tags representing the context.

20. The non-transitory computer-readable storage medium of claim 19, wherein enabling use of each data element with the one or more applications without requiring manual input of the extracted terms into the one or more applications involves:

obtaining, from an application, a request for data associated with a tag from the one or more tags;

matching the tag to one of the data elements; and providing the one of the data elements to the application.

* * * * *